(12) United States Patent
Galazin et al.

(10) Patent No.: US 10,186,069 B2
(45) Date of Patent: Jan. 22, 2019

(54) METHODS AND SYSTEMS FOR GROUPING AND EXECUTING INITIAL PILOT SHADER PROGRAMS

(71) Applicant: ARM Limited, Cambridge (GB)

(72) Inventors: Alexander Galazin, Trondheim (NO); Jörg Wagner, Trondheim (NO); Andreas Due Engh-Halstvedt, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/433,398

(22) Filed: Feb. 15, 2017

(65) Prior Publication Data

US 2018/0232935 A1 Aug. 16, 2018

(51) Int. Cl.
*G06T 15/00* (2011.01)
*G06T 15/80* (2011.01)
*G06F 9/44* (2018.01)

(52) U.S. Cl.
CPC .............. *G06T 15/005* (2013.01); *G06F 9/44* (2013.01); *G06T 15/80* (2013.01)

(58) Field of Classification Search
CPC .......... G06T 15/005; G06T 15/80; G06F 9/44
USPC ....................................................... 345/426
See application file for complete search history.

(56) References Cited

U.S. PATENT DOCUMENTS

| | | | |
|---|---|---|---|
| 7,594,095 B1 * | 9/2009 | Nordquist | G06F 9/4843 712/22 |
| 8,081,184 B1 * | 12/2011 | Nordquist | G06T 15/005 345/426 |
| 9,799,089 B1 * | 10/2017 | Chen | G06T 1/20 |
| 2013/0169642 A1 * | 7/2013 | Frascati | G06T 15/80 345/426 |
| 2014/0354669 A1 | 12/2014 | Galazin | |
| 2015/0193969 A1 * | 7/2015 | Nystad | G06T 15/005 345/426 |

* cited by examiner

*Primary Examiner* — Jacinta M Crawford
(74) *Attorney, Agent, or Firm* — Vierra Magen Marcus LLP

(57) ABSTRACT

A graphics processing system groups plural initial pilot shader programs into a set of initial pilot shader programs and associates the set of initial pilot shader programs with a set of indexes. The initial pilot shader programs each contain constant program expressions to be executed on behalf of an original shader program. The index for an initial pilot shader program is then used to obtain the instructions contained in the initial pilot shader program for executing the constant program expressions of the initial pilot shader program. The threads for executing a subset of the initial pilot shader programs are also grouped into a thread group and the threads of the thread group are executed in parallel. The graphics processing system provides for efficient preparation and execution of plural initial pilot shader programs.

20 Claims, 6 Drawing Sheets

METHODS AND SYSTEMS FOR GROUPING AND EXECUTING INITIAL PILOT SHADER PROGRAMS

BACKGROUND

The technology described herein relates to computer graphics processing and in particular to the operation of computer graphics processing systems that include one or more programmable shading stages ("shaders").

Graphics processing is typically carried out in a pipelined fashion, with one or more pipeline stages operating on the data to generate the final render output, e.g. a graphics texture or a frame that is displayed. Many graphics processing pipelines include one or more programmable shading stages, commonly referred to as "shaders", which execute programs to perform graphics processing operations to generate the desired graphics data. For example, a graphics processing pipeline may include one or more of, and typically all of, a geometry shader, a vertex shader and a fragment (pixel) shader. These shaders are programmable shading stages that execute shader programs on input data values to generate a desired set of output data for processing by the rest of the graphics pipeline and/or for output. The shaders of the graphics processing pipeline may share programmable processing circuitry, or they may each be distinct programmable processing units.

A shader program to be executed by a given "shader" of a graphics processing pipeline will typically be provided by the application that requires the graphics processing using a high-level shader programming language, such as GLSL, HLSL, OpenCL, etc. This shader program will consist of "expressions" indicating desired programming steps defined in the relevant language standards (specifications). The high-level shader program is then translated by a shader language compiler to binary code for the target graphics processing pipeline. This binary code will consist of "instructions" which are specified in the instruction set specification for the given target graphics processing pipeline. The compilation process for converting the shader language expressions to binary code instructions may take place via a number of intermediate representations of the program within the compiler. Thus, the program written in the high-level shader language may be translated into a compiler specific intermediate representation (and there may be several successive intermediate representations within the compiler), with the final intermediate representation being translated into the binary code instructions for the target graphics processing pipeline.

Thus, references to "expressions" herein, unless the context otherwise requires, refer to shader language constructions that are to be compiled to a target graphics processor binary code (i.e. are to be expressed in hardware microinstructions). Such shader language constructions may, depending on the shader language in question, be referred to as "expressions", "statements", etc. (For convenience, the term "expressions" will be used herein, but this is intended to encompass all equivalent shader language constructions such as "statements" in GLSL. "Instructions" correspondingly refers to the actual hardware instructions (code) that are emitted to perform an "expression".)

When a graphics processing output (e.g. a graphics texture or a frame for display) is required, the graphics processing pipeline will be provided with a set of "commands" to generate the desired output. These "commands" are usually in the form of draw call descriptors which define draw calls to be executed by the graphics processing pipeline. These draw calls and their descriptors are generated in response to commands from an application running on a host system for graphics processing. A given draw call may use some or all of the graphics processing pipeline stages.

The Applicants believe that there remains scope for improvements to the operation of graphics processing systems that include one or more programmable shader stages.

BRIEF DESCRIPTION OF THE DRAWINGS

Various embodiments of the technology described herein will be described by way of example only and with reference to the accompanying drawings, in which.

Figure 1:
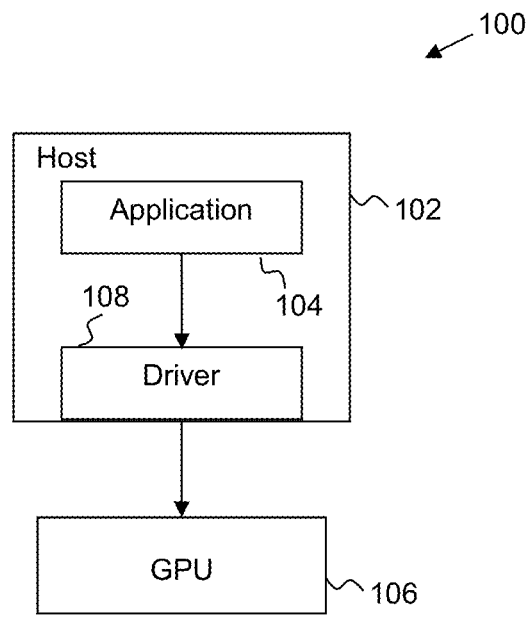
FIG. 1 shows a computer graphics processing system that can be operated in the manner of the technology described herein.

The drawings show elements of a graphics processing system that are relevant to embodiments of the technology described herein. As will be appreciated by those skilled in the art, there may be other elements of the graphics processing system that are not illustrated in the drawings. It should also be noted that the drawings are only schematic, and that, for example, in practice the shown elements may share significant hardware circuits, even though they are shown schematically as separate elements in the drawings. Like reference numerals are used for like elements where appropriate in the drawings.

DETAILED DESCRIPTION

An embodiment of the technology described herein comprises a method of operating a graphics processing system that includes one or more programmable shading stages which execute graphics shader programs to perform graphics processing operations, the method comprising:

grouping plural initial shader programs into a set of initial shader programs, wherein an initial shader program of the set of initial shader programs contains instructions for executing constant program expressions of an original shader program;

associating the set of initial shader programs with a set of indexes, wherein an index associated with an initial shader program indicates the instructions contained in the initial shader program for executing the constant program expressions of the initial shader program; and for an initial shader program of the set of initial shader programs:
  using the index associated with the initial shader program to obtain the instructions contained in the initial shader program for executing the constant program expressions of the initial shader program; and
  executing the initial shader program, wherein executing the initial shader program comprises generating and storing output values for the constant program expressions of the initial shader program for use by a subsequent shader program.

Another embodiment of the technology described herein comprises a graphics processing system that includes one or more programmable shading stages which execute graphics shader programs to perform graphics processing operations, the system comprising processing circuitry configured to:

group plural initial shader programs into a set of initial shader programs, wherein an initial shader program of the set of initial shader programs contains instructions for executing constant program expressions of an original shader program;

associate the set of initial shader programs with a set of indexes, wherein an index associated with an initial shader program indicates the instructions contained in the initial shader program for executing the constant program expressions of the initial shader program; and for an initial shader program of the set of initial shader programs:

use the index associated with the initial shader program to obtain the instructions contained in the initial shader program for executing the constant program expressions of the initial shader program; and execute the initial shader program, wherein executing the initial shader program comprises generating and storing output values for the constant program expressions of the initial shader program for use by a subsequent shader program.

The technology described herein executes constant program expressions of an original shader program in an initial "pilot" shader program for the original shader program in advance of a separate subsequent "main" shader program. The subsequent shader program can then use the results of the initial pilot shader program. Thus, the instructions emitted for a constant program expression may be executed only once in the initial pilot shader program, rather than having to be executed multiple times in the corresponding original shader program each time the result for the expression in question is required. This can therefore remove repeated calculations from the shading process.

In the technology described herein, plural such initial pilot shader programs are provided, for example for one or more draw calls for an output (e.g. graphics texture or frame to be displayed). In the technology described herein, rather than handling each one of these initial pilot shader programs separately, the plural initial pilot shader programs are grouped into a set of initial pilot shader programs and a set of indexes is associated with the initial pilot shader programs of the set. An index for an (or for each respective) initial pilot shader program is then used to obtain the instructions contained in that (respective) initial pilot shader program for executing the constant program expressions of that initial pilot shader program. The Applicants have identified that handling a set of initial pilot shader programs together in this way can significantly reduce the amount of processing overhead needed in order to prepare plural initial pilot shader programs for execution, since preparatory processes can be performed, and/or one or more sets of draw call descriptors can be prepared, for the set of initial pilot shader programs as a whole, rather than individually for the respective initial pilot shader programs. Furthermore, using an index to obtain the instructions contained in an (or in each respective) initial pilot shader program of the set of initial pilot shader programs can facilitate the process of obtaining the relevant instructions for that (respective) initial pilot shader program, and thus can increase the efficiency of the process of executing the initial pilot shader program(s).

The programmable shading stages ("shaders") can comprise any desired and suitable such stages. The programmable shading stages may be stages of a graphics processing pipeline. The programmable shading stages may, for example, include one or more programmable shading stages selected from a group consisting of: a geometry shader, a hull shader, a domain shader, a vertex shader and a fragment (pixel) shader. As well as one or more programmable shading stages, the graphics processing pipeline may contain any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The programmable shading stages can be implemented as desired and in any suitable manner, and can perform any desired and suitable graphics processing (shading) operations, e.g. geometry shading, hull shading, domain shading, vertex shading, fragment (pixel) shading, etc., respectively and as appropriate. In the case of a fragment shader, for example, the fragment shader may render graphics fragments to generate a set of render output values, e.g. representing a graphics texture or a frame for display. These output values may then be exported to external memory for storage and use, such as to a texture buffer for use as a graphics texture or to a frame buffer for a display.

Each programmable shading stage may comprise any suitable programmable hardware element, such as programmable processing circuitry. Each programmable shading stage may be provided as separate circuitry to other programmable stages (e.g. shaders) of the processing pipeline or the programmable shading stages may share some or all of their programmable processing circuitry (e.g. of a compute engine), which is then differently programmed to serve as the desired programmable stage.

The set of initial pilot shader programs can comprise any desired and suitable initial pilot shader programs. The set of initial pilot shader programs can, for example, comprise initial pilot shader programs regardless of the type of shader program. For example, the set of initial pilot shader programs can comprise initial pilot shader programs for one or more types of shader program, for example selected from a group consisting of: a geometry shader program, a hull shader program, a domain shader program, a vertex shader program and a fragment (pixel) shader program. The set of initial pilot shader programs can comprise initial pilot shader programs for one or more draw calls and/or one or more outputs (one or more graphics textures or one or more frames). The set of initial pilot shader programs can comprise any desired and suitable number of initial pilot shader programs, such as at least or exactly 4, 8, 16, 64, 128, etc., initial pilot shader programs.

Grouping the plural initial pilot shader programs into the set of initial pilot shader programs can be performed in any desired and suitable way. For example, grouping the plural initial pilot shader programs into the set of initial pilot shader programs may comprise representing the set of initial pilot shader programs with an array. The array may be one dimensional, two dimensional, three dimensional, etc. In these embodiments, using an index associated with an initial pilot shader program to obtain the instructions contained in the initial pilot shader program may comprise using the index to index into the array to obtain the instructions contained in the initial pilot shader program.

The set of initial pilot shader programs may be represented in any desired and suitable way. For example, the set of initial pilot shader programs may be represented by a set of program counters or pointers to program counters for the set of initial pilot shader programs. Thus, grouping the plural initial pilot shader programs into the set of initial pilot shader programs may comprise providing an array of program counters or pointers to program counters for the set of initial pilot shader programs. In these embodiments, using an index associated with an initial pilot shader program to obtain the instructions contained in the initial pilot shader program may comprise using the index for the initial pilot shader program to obtain a program counter, or a pointer to a program counter and then the program counter, for the initial pilot shader program.

Grouping the plural initial pilot shader programs into the set of initial pilot shader programs may further comprise sorting the initial pilot shader programs of the set of initial pilot shader programs, for example based on similarity of the initial pilot shader programs (e.g. at least coarsely, e.g. not entirely). For example, initial pilot shader programs that are similar or identical may be represented as being adjacent to each other in an array. In embodiments in which the set of initial pilot shader programs are indicated by an array of program counters or pointers to program counters, grouping the plural initial pilot shader programs into the set of initial pilot shader programs may comprise sorting the array of program counters or pointers to program counters based on the program counters or pointers to program counters for the set of initial pilot shader programs. For example, program counters or pointers to program counters that are identical or that correspond to initial pilot shader programs that are similar or identical may be placed adjacent to each other in the array.

Grouping the plural initial pilot shader programs into the set of initial pilot shader programs can be performed in and by any suitable part of the graphics processing system. For example, a compiler for the shader or shaders in question may perform this operation. Alternatively, this operation may be performed by a hardware element (circuitry). Similarly, sorting the initial pilot shader programs of the set of initial pilot shader programs can be performed in and by any suitable part of the graphics processing system. For example, the compiler for the shader or shaders in question may perform this operation. Alternatively, this operation may be performed by a hardware element (circuitry).

An index associated with an initial pilot shader program can take any desired and suitable form. For example, an index associated with an initial pilot shader program may correspond to (e.g. may be or may be derived from) a thread index for a thread (or "execution thread") that will be used to execute that initial pilot shader program. Thus, embodiments may comprise using a thread index for a thread that will be used to execute an initial pilot shader program as, or to derive, the index associated with the initial pilot shader program. That thread index, or the index derived from that thread index, may then be used to obtain the instructions contained in the initial pilot shader program. These embodiments can provide a convenient and efficient way to obtain instructions for an initial pilot shader program of the set of initial pilot shader programs.

Using the index associated with an initial pilot shader program to obtain the instructions contained in the initial pilot shader program can be performed in and by any suitable part of the graphics processing system. For example, a hardware element (circuitry) of the graphics processing system may perform this function. For example, a ("pilot") spawning engine of the graphics processing system, which generates or "spawns" threads for execution by the graphics processing system, may perform this operation. In these embodiments, the hardware element (circuitry) may use an index associated with an initial pilot shader program to obtain the instructions contained in the initial pilot shader program, and may then spawn a thread for executing the initial pilot shader program in question.

Alternatively, a programmable processing element (circuitry) of the graphics processing system may perform this function. For example, a compute engine of the graphics processing system, which executes threads for shader programs, may perform this operation. In these embodiments, the programmable processing element (circuitry) may execute (generic) "trampoline" code that uses an index associated with an initial pilot shader program to obtain the instructions contained in that initial pilot shader program, and may then branch or jump to the initial pilot shader program in question. In these embodiments, a hardware element (circuitry) or spawning engine of the graphics processing system may spawn a thread for executing the "trampoline" code.

Executing an initial pilot shader program of the set of initial pilot shader programs may be performed in any desired and suitable way. For example, executing an initial pilot shader program of the set of initial pilot shader programs may comprise executing that initial pilot shader program on a graphics processing pipeline. Executing the initial pilot shader program on the graphics processing pipeline ensures that the results and execution of the program are guaranteed to be the same as if the original shader program was performed in the normal manner on the graphics processing pipeline. It also facilitates re-use of the already existing programmable processing stages of the graphics processing pipeline, and thus avoids the need to develop any code necessary to emulate the operation on host processing circuitry.

As indicated above, executing an initial pilot shader program of the set of initial pilot shader programs may comprise the graphics processing system executing a thread (or "execution thread") for the initial pilot shader program. The graphics processing system may be configured to group plural such threads together into a thread group in which the threads of the thread group each execute their respective set of instructions in parallel, for example in lockstep and/or one instruction at a time. (Other terms used for such thread groups include "warps" and "wavefronts". For convenience the term thread group will be used herein, but this is intended to encompass all equivalent terms and arrangements, unless otherwise indicated.)

Thus, embodiments may further comprise grouping threads for executing a subset of initial shader programs of the set of initial shader programs into a thread group, and executing the threads of the thread group in parallel (simultaneously), for example in lockstep and/or one instruction at a time, so as to execute the subset of initial shader programs. This way instruction fetch and scheduling resources may be shared between all the threads in a thread group.

Thus, another embodiment of the technology described herein comprises a method of operating a graphics processing system that includes one or more programmable shading stages which execute graphics shader programs to perform graphics processing operations, the method comprising:

grouping threads for executing a subset of initial shader programs of a set of initial shader programs into a thread group, wherein an initial shader program of the set of initial shader programs contains instructions for executing constant program expressions of an original shader program; and executing the threads of the thread group in parallel so as to execute the subset of initial shader programs, wherein executing an initial shader program of the subset of initial shader programs comprises generating and storing output values for the constant program expressions of the initial shader program for use by a subsequent shader program.

Another embodiment of the technology described herein comprises a graphics processing system that includes one or more programmable shading stages which execute graphics shader programs to perform graphics processing operations, the system comprising processing circuitry configured to:

group threads for executing a subset of initial shader programs of a set of initial shader programs into a thread group, wherein an initial shader program of the set of initial shader programs contains instructions for executing constant program expressions of an original shader program; and execute the threads of the thread group in parallel so as to execute the subset of initial shader programs, wherein executing an initial shader program of the subset of initial shader programs comprises generating and storing output values for the constant program expressions of the initial shader program for use by a subsequent shader program.

These embodiments may include one or more or all of the optional features described herein as appropriate. For example, as described above, embodiments may comprise associating a set of indexes with the set (and thus subset) of initial pilot shader programs, wherein an index associated with an initial pilot shader program indicates the instructions contained in the initial pilot shader program for executing the constant program expressions of the initial pilot shader program. Embodiments may then comprise, for an initial pilot shader program of the subset of initial pilot shader programs, using the index associated with the initial pilot shader program to obtain the instructions contained in the initial pilot shader program for executing the constant program expressions of the initial pilot shader program. As indicated above, an index associated with an initial pilot shader program may correspond to (e.g. may be or may be derived from) a thread index for a thread that is used to execute the initial pilot shader program. As indicated above, these embodiments can provide a convenient and efficient way to obtain instructions for an initial pilot shader program.

Furthermore, as indicated above, the initial pilot shader programs of the set (and thus subset) of initial pilot shader programs may be sorted, for example based on similarity of the initial pilot shader programs. For example, initial pilot shader programs that are similar or identical may be represented as being adjacent to each other in an array. As discussed above, in embodiments in which the set of initial pilot shader programs are indicated by an array of program counters or pointers to program counters, program counters or pointers to program counters that are identical or that correspond to initial pilot shader programs that are similar or identical may be placed adjacent to each other in the array. These embodiments can facilitate grouping the threads for executing a subset of similar or identical initial pilot shader programs into a thread group, since similar or identical initial pilot shader programs will already be represented as being adjacent to each other in the array.

Thus, embodiments may comprise grouping the threads for executing the subset of initial pilot shader programs of the set of initial pilot shader programs into a thread group based on similarity of the initial pilot shader programs. Thus, a thread group may comprise threads for initial pilot shader programs that are similar or identical (e.g. that contain similar or identical instructions). For example, threads for initial pilot shader programs that have the same program counter or pointer to a program counter may be grouped into a thread group. This can then provide for efficient execution of the initial pilot shader programs, since the subset of similar or identical initial pilot shader programs will tend to perform similar or identical operations (e.g. load, compute, and/or store operations), and such operations can be performed simultaneously (e.g. and in lockstep and/or one instruction at a time) by the graphics processing system, e.g. sharing instruction fetch and scheduling resources between all the threads in the thread group.

The graphics processing system may be configured so as to use a particular thread group size. The particular thread group size may, for example, be four threads. The subset of initial pilot shader programs can be any desired and suitable size in terms of initial pilot shader programs, for example up to the particular thread group size used by the graphics processing system. For example, the subset of initial pilot shader programs may be up to four initial pilot shader programs in size. Similarly, the thread group can be any desired and suitable size in terms of threads, for example up to the particular thread group size used by the graphics processing system. For example, the thread group may be up to four threads in size.

An execution lane may be provided for executing a thread for an initial pilot shader program, and a set of such execution lanes may be allocated for executing the threads of a thread group. The number of execution lanes allocated to a thread group may be the particular thread group size used by the graphics processing system, and may be fixed (e.g. the same regardless of the number of threads in the thread group). For example, a set of four execution lanes may be allocated for executing a thread group (e.g. regardless of the number of threads in the thread group).

In some cases, a subset of initial pilot shader programs may comprise the same number of initial pilot shader programs as the particular thread group size. In these cases, threads may be grouped into a thread group so that the thread group comprises the same number of threads as the particular thread group size. This can make full use of the execution lanes allocated to a thread group. In some of these cases, the initial pilot shader programs of the subset of initial pilot shader programs may be similar or identical. This not only makes full use of the execution lanes allocated to a thread group, but can also provide for parallel (and e.g. lockstep and/or one instruction at a time) execution of the subset of similar or identical initial pilot shader programs in a single thread group. However, in others of these cases, the initial pilot shader programs of the subset of initial pilot shader programs may be dissimilar (e.g. where there is an insufficient number of sufficiently similar or identical initial pilot shader programs for a "full" thread group).

In other cases, a subset of initial pilot shader programs may comprise fewer initial pilot shader programs than the particular thread group size (e.g. where there is an insufficient number of sufficiently similar or identical initial pilot shader programs for a "full" thread group). In these other cases, threads may be grouped into a thread group so that the thread group comprises fewer threads than the particular thread group size. Whilst these other cases may not make full use of the execution lanes allocated to a thread group, this is considered acceptable in many situations, for example so as to provide for parallel (and e.g. lockstep and/or one instruction at a time) execution of similar or identical initial pilot shader programs in isolation (from other dissimilar initial pilot shader programs) in a single thread group. In these other cases, one or more of the execution lanes allocated to a thread group may be disabled and/or one or more execution lanes may execute a "dummy" thread, for example that terminates substantially immediately. The "dummy" thread may be a thread for (generic) "trampoline" code, as discussed above.

In yet other cases, a (single) thread for a (single) initial pilot shader program may be allocated to a thread group (e.g. where the initial pilot shader program does not form part of a subset of (e.g. similar or identical) initial pilot shader programs and/or is unique within the set of initial pilot shader programs). In these yet other cases, all but one of the execution lanes allocated to a thread group may be disabled and/or all but one of the execution lanes may execute a "dummy" thread, for example that terminates substantially immediately.

In embodiments in which the set of initial pilot shader programs is represented by an array (e.g. of program counters or pointers to program counters), sorting the plural initial pilot shader programs may further comprise inserting null elements into the array, for example so as to facilitate the grouping of threads for a particular subset of (similar or identical) initial pilot shader programs into a particular thread group (comprising only threads for that particular subset of (similar or identical) initial pilot shader programs).

Embodiments may further comprise providing draw call descriptors (e.g. descriptors tables) to be used when executing the set of initial pilot shader programs. The descriptors may be represented as one or more sets (e.g. one or more arrays) of descriptors or pointers to descriptors. The draw call descriptors may comprise descriptors selected from a group consisting of: uniform descriptors, sampler descriptors, and texture descriptors. The descriptors may comprise descriptors specific to an initial pilot shader program and/or draw call. The descriptors may also or instead comprise generalised resource descriptors.

Providing draw call descriptors to be used when executing the set of initial pilot shader programs may be performed in and by any suitable part of the graphics processing system. For example, a compiler for the shader or shaders in question may perform this operation.

In embodiments, executing an initial pilot shader program may comprise using a descriptor index to obtain draw call descriptors for an initial pilot shader program. The descriptor index for an initial pilot shader program can take any desired and suitable form. For example, the descriptor index for an initial pilot shader program may correspond to (e.g. may be or may be derived from) a thread index for the thread that executes the initial pilot shader program. Thus, embodiments may comprise using a thread index for a thread that executes an initial pilot shader program as, or to derive, a descriptor index for the initial pilot shader program. That descriptor index may then be used to obtain the draw call descriptors for the initial pilot shader program. These embodiments can provide a convenient and efficient way to obtain draw call descriptors for an initial pilot shader program of the set of initial pilot shader programs.

Thus, in some cases, the descriptor index for an initial pilot shader program may be the thread index for that initial pilot shader program. However, in other cases, for example where the graphics processing system is configured to group threads for executing subsets of (e.g. similar or identical) initial pilot shader programs together into thread groups and/or is configured to allocate a single thread for a single initial pilot shader program to a thread group, the descriptor index for an initial pilot shader program may be derived by dividing the thread index for that initial pilot shader program by the particular thread group size of the graphics processing system and then taking the floor of the division. This can reduce the number of descriptor indexes needed to obtain the draw call descriptors and/or reduce the number of sets of descriptors or pointers to draw call descriptors that need to be provided, for example by allowing initial pilot shader programs that correspond to a particular thread group to "share" a set of descriptors, which can then be obtained using a shared descriptor index.

As will be appreciated from the above, in embodiments, the thread index for an initial pilot shader program can be used both to obtain the instructions contained in the initial pilot shader program and to obtain draw call descriptors for the initial pilot shader program. This dual-use of the thread index can significantly simplify, and improve the efficiency of, the graphics processing being performed. In these embodiments, the sets of draw call descriptors or pointers to draw call descriptors may be sorted (e.g. so as to correspond to an order applied when sorting the set of initial pilot shader programs), so as to allow the thread index for an initial pilot shader program to be readily used both to obtain the instructions contained in the initial pilot shader program and to obtain draw call descriptors for the initial pilot shader program.

Embodiments may further comprise, for an initial pilot shader program of the set of initial pilot shader programs, subsequently executing a subsequent shader program corresponding to the initial pilot shader program that contains load instructions which point to output values generated and stored for the constant program expressions by executing the initial pilot shader program. Subsequently executing the subsequent shader program may comprise, in response to the load instructions of the subsequent shader program that point to output values generated and stored for the constant program expressions by executing the initial pilot shader program, loading the output values generated and stored for the constant program expressions by executing the initial pilot shader program for processing by the subsequent shader program.

Subsequently executing a subsequent shader program corresponding to an initial pilot shader program of the set of initial pilot shader programs may be performed in any desired and suitable way. For example, subsequently executing a subsequent shader program corresponding to an initial pilot shader program of the set of initial pilot shader programs may comprise executing the subsequent shader program on the graphics processing pipeline.

Embodiments may further comprise creating one or more initial pilot shader programs of the set of initial pilot shader programs. Creating an initial pilot shader program of the set of initial pilot shader programs may comprise identifying, in an original shader program, constant program expressions. Embodiments may then comprise creating the initial pilot shader program of the set of initial pilot shader programs, wherein the initial pilot shader program contains instructions for executing the constant program expressions.

Embodiments may further comprise creating a subsequent shader program that corresponds to an initial pilot shader program of the set of initial pilot shader programs that contains load instructions which point to output values to be generated and stored for the constant program expressions by executing the initial pilot shader program. Creating a subsequent shader program that corresponds to an initial pilot shader program of the set of initial pilot shader programs may comprise removing instructions for executing constant program expressions from an original shader program and replacing the instructions for executing the constant program expressions with the load instructions that point to the output values to be generated and stored for the constant program expressions by executing the initial pilot shader program.

The identification of constant program expressions in an original shader program, and the corresponding creation of an initial pilot shader program, and the corresponding creation of a subsequent shader program, can be performed as desired. For example, the identification of constant program expressions in an original shader program can identify those expressions in any suitable form in the, e.g., compilation process, for example as "expressions" in the high level shader language, or as a corresponding set of instructions in the target code for a graphics processing pipeline, or as an appropriate set of "operations" in some intermediate representation of the shader program.

Thus, the identification of constant program expressions may be carried out on or using an intermediate representation of an original shader program. Similarly, an initial pilot shader program containing instructions for executing the constant program expressions may be created in the form of a higher level shader language program that is then subsequently converted to the necessary instructions for execution, e.g. on a graphics processing pipeline, or may be created directly as a set of instructions to be executed, e.g. on a graphics processing pipeline, or may be created in the form of some intermediate representation that is then converted to the instructions for execution, e.g. on a graphics processing pipeline. Thus, the creation of an initial pilot shader program may create that initial pilot shader program in the form of an intermediate representation that will then be translated to binary code "instructions" for execution, e.g. on a graphics processing pipeline.

The identification of constant program expressions in an original shader program, and the corresponding creation of an initial pilot shader program, and the corresponding creation of a subsequent shader program, can be performed in and by any suitable stage or component of the graphics processing system. For example, a compiler for the shader or shaders in question may perform this operation.

As discussed above, an original shader program to be executed by a given programmable shading stage will normally be provided by the application that requires the graphics processing using a high-level shader programming language, such as GLSL, HLSL, OpenCL, etc. This shader program is then translated by a shader language compiler to binary code for a target graphics processing pipeline. Thus in embodiments, the shader compiler may identify constant expressions in the original shader program in question, prevent the instructions for executing those constant program expressions from being emitted into a target graphics processing pipeline binary code, create instead a separate binary code that contains hardware instructions for the constant program expressions only, and then provide the relevant binary code to a graphics processing pipeline for execution.

The constant program expressions can comprise any desired and suitable constant program expressions, for example that operate on constant inputs. The constant inputs can comprise any desired and suitable inputs, such as inputs that cannot vary and/or that will not vary, e.g. between draw calls. The constant inputs may also or instead comprise inputs that could vary, e.g. between draw calls, but that are determined to be constant, e.g. for one or more particular draw calls, at run time (i.e. "run time constant inputs").

The output values of an initial pilot shader program can be stored as desired. The output values may be stored in such a manner that those values can be loaded and treated as input values by a subsequent shader program when the substituted load instructions in that subsequent shader program are executed. Thus, the output of an initial pilot shader program may be a memory area storing input values for a subsequent shader program. This memory area may be any storage accessible in a shader program via graphics processing pipeline instructions (such as main memory, stack memory, a tile buffer, uniform memory, and so on). This memory area may, e.g., be addressed directly, be remapped as a colour buffer (render target), or be remapped as an initial pilot shader program's stack area. The output of an initial pilot shader program may be mapped as (written to) a colour buffer (render target), and the output colour buffer of that initial pilot shader program is then mapped to the input uniform of the corresponding subsequent shader program (i.e. load instructions in a subsequent shader program may point to and instruct loads from an output colour buffer that will be generated by an initial pilot shader program).

As will be appreciated, one or more of the processes described herein which are performed in respect of an initial pilot shader program may, in practice, be performed in respect of each (e.g. every) one of plural initial pilot shader programs of the set or subset of initial pilot shader programs. Embodiments may, for example, comprise executing each (e.g. every) one of plural initial pilot shader programs of the set or subset of initial pilot shader programs (up-front). Embodiments may then (subsequently) comprise executing each (e.g. every) one of plural subsequent shader programs for the plural initial pilot shader programs of the set or subset of initial pilot shader programs.

As will also be appreciated, one or more of the processes described herein which are performed in respect of the set or subset of initial pilot shader programs may, in practice, be performed in respect of each (e.g. every) one of plural sets or subsets of initial pilot shader programs. Similarly, one or more of the processes which are performed in respect of a thread group may, in practice, be performed in respect of each (e.g. every) one of plural thread groups.

The technology described herein can be used for all forms of output that a graphics processing system may be used to generate, such as frames for display, render-to-texture outputs, etc. The output, e.g. fragment shaded, data values from the graphics processing may be exported to external, e.g. main, memory, for storage and use, such as to a texture buffer or to a frame buffer for a display.

The technology described herein is applicable to any suitable form or configuration of graphics processing system, such as tile-based graphics processors and graphics processing systems. Thus, the graphics processing system and graphics processing pipeline may be a tile-based system and pipeline, respectively.

The various functions of the technology described herein may be carried out on a single graphics processing platform that generates and outputs rendered fragment data that is, e.g., written to a texture buffer or to a frame buffer for a display device.

In embodiments, the system may comprise, and/or may be in communication with, one or more memories and/or memory devices that store the data described herein, and/or store software for performing the processes described herein. The system may comprise, and/or may be in communication with, a host microprocessor, and/or with a display for displaying an output (frame or image) based on the data generated by the graphics processing.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (circuitry) and/or programmable hardware elements (circuitry) that can be programmed to operate in the desired manner.

The various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing system and pipeline can otherwise include any one or more or all of the usual functional units, etc., that graphics processing systems and pipelines include.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. Thus, embodiments of the technology described herein may comprise computer software specifically adapted to carry out the methods herein described when installed on one or more data processors, a computer program element comprising computer software code portions for performing the methods described herein when the program element is run on one or more data processors, and a computer program comprising code adapted to perform all the steps of a method or of the methods described herein when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system causes said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus embodiments of the technology described herein may comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

As discussed above, embodiments of the technology described herein relate to arrangements in which plural initial pilot shader programs, which each execute constant program expressions on behalf of an original shader program, are grouped into a set of initial pilot shader programs and are associated with a set of indexes. An index associated with an initial pilot shader program is then used to obtain the instructions contained in the initial pilot shader program for executing the constant program expressions of the initial pilot shader program. As is also discussed above, embodiments of the technology described herein relate to arrangements in which the threads for executing a subset of the initial pilot shader programs are grouped into a thread group and the threads of the thread group are executed in parallel. Embodiments of the technology described herein accordingly provide for both efficient preparation and efficient execution of plural initial pilot shader programs.

Embodiments of the present technology will now be described in more detail with reference to a computer graphics processing system 100 as shown in FIG. 1. In this embodiment, an application 104, such as a game, executing on a host processor 102 requires graphics processing operations to be performed by an associated graphics processor 106 that implements a graphics processing pipeline. To do this, the application 104 generates API (Application Programming Interface) calls that are interpreted by a driver 108 for the graphics processor 106 that is running on the host processor 102 to generate appropriate commands to the graphics processor 106 to generate the graphics output required by the application 104. To facilitate this, a set of "commands" is provided to the graphics processor 106 in response to commands from the application 104 running on the host processor 102 for graphics output (e.g. to generate a graphics texture or a frame to be displayed). The "commands" to the graphics processor 106 to generate an output (e.g. to render graphics textures or frames for display) are provided to the graphics processing pipeline in the form of draw calls that are generated in response to commands from the application 104 running on the host processor 102 for graphics processing. Each draw call can use one or more of the stages of the graphics processing pipeline.

Figure 2:
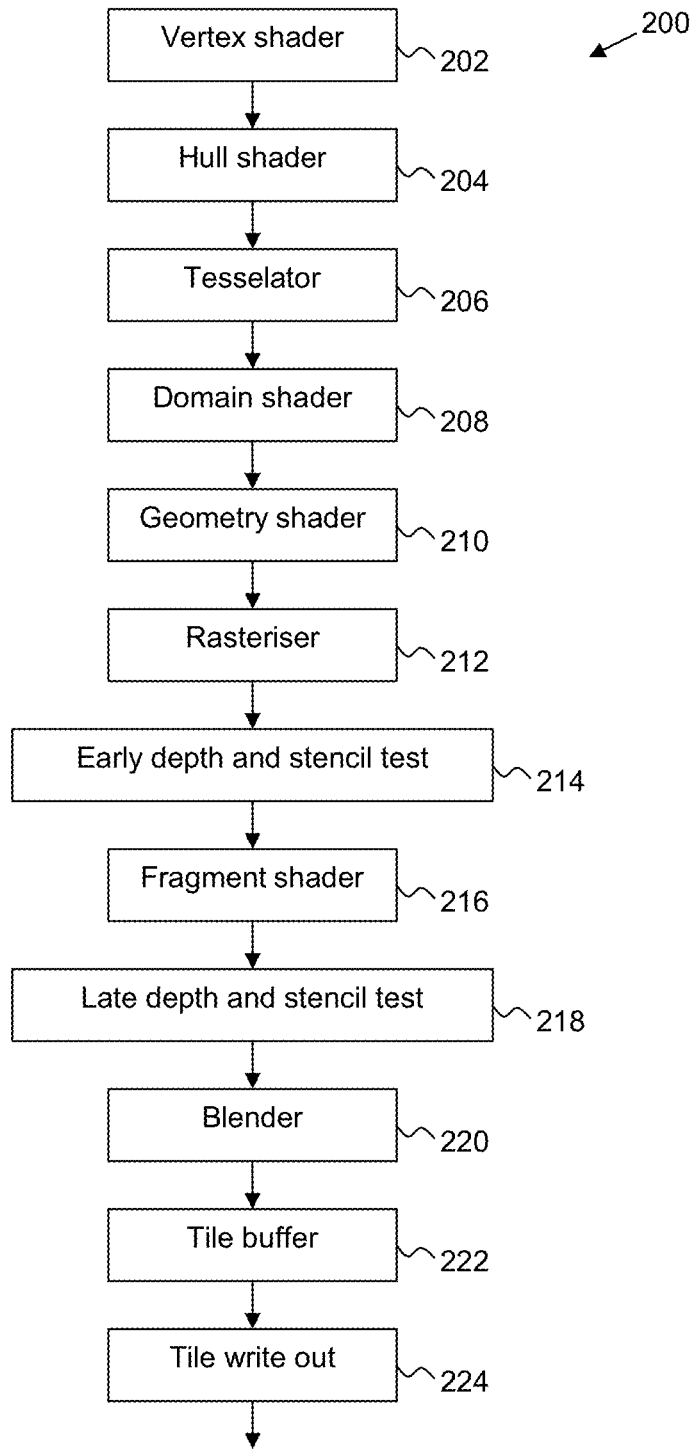
FIG. 2 shows schematically a graphics processing pipeline that can be implemented in the manner of the technology described herein.

FIG. 2 shows the graphics processing pipeline 200 of the present embodiment in more detail. The graphics processing pipeline 200 is a tile-based renderer and will thus produce tiles of a render output data array, such as a graphics texture or frame to be generated. In tile-based rendering, rather than the entire render output, e.g., graphics texture or frame for display, effectively being processed in one go, the render output is divided into a plurality of smaller sub-regions, usually referred to as "tiles". Each tile is rendered separately (e.g. one-after-another), and the rendered tiles are then recombined to provide the complete render output, e.g., graphics texture or frame for display. The render output can be divided into regularly-sized and shaped tiles (such as squares or rectangles), but this is not essential.

In this embodiment, when a computer graphics image is to be displayed, it is defined as a series of primitives (polygons), which primitives are then divided (rasterised) into graphics fragments for graphics rendering in turn. During a graphics rendering operation, the renderer modifies the, e.g., colour (red, green and blue, RGB) and transparency (alpha, a), data associated with each fragment so that the fragments can be displayed correctly. Once the fragments have fully traversed the renderer, then their associated data values are stored in memory, ready for output, e.g. for display. The render output data array may therefore be an output frame intended for display on a display device, such as a screen or printer, but may also, for example, comprise intermediate data intended for use in later rendering passes (also known as a "render to texture" output), etc.

FIG. 2 shows the main elements and pipeline stages of the graphics processing pipeline 200 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline 200 as shown in FIG. 2 may be implemented as desired and will accordingly comprise, e.g., appropriate circuitry and/or processing logic, etc., for performing the necessary operation and functions.

As is shown in FIG. 2, the graphics processing pipeline 200 includes a number of stages, including vertex shader 202, a hull shader 204, a tesselator 206, a domain shader 208, a geometry shader 210, a rasterisation stage 212, an early Z (depth) and stencil test stage 214, a renderer in the form of a fragment shading stage 216, a late Z (depth) and stencil test stage 218, a blending stage 220, a tile buffer 222 and a downsampling and writeout (multisample resolve) stage 224.

The vertex shader 202 takes input data values associated with the vertices, etc., defined for the output to be generated, and processes those data values to generate a set of corresponding "vertex shaded" output data values for use by subsequent stages of the graphics processing pipeline 200. The vertex shading, for example, modifies the input data to take account of the effect of lighting in the image to be rendered.

The hull shader 204 performs operations on sets of patch control points and generates additional data known as patch constants, the tessellation stage 206 subdivides geometry to create higher-order representations of the hull, the domain shader 208 performs operations on vertices output by the tessellation stage (similar to a vertex shader), and the geometry shader 210 processes entire primitives such as a triangles, points or lines. These stages together with the vertex shader 202 effectively perform all the necessary fragment frontend operations, such as transformation and lighting operations, and primitive setup, to setup the primitives to be rendered, in response to commands and vertex data provided to the graphics processing pipeline 200.

The rasterisation stage 212 of the graphics processing pipeline 200 operates to rasterise the primitives making up the render output (e.g. the graphics texture or the image to be displayed) into individual graphics fragments for processing. To do this, the rasteriser 212 receives graphics primitives for rendering, rasterises the primitives to sampling points and generates graphics fragments having appropriate positions (representing appropriate sampling positions) for rendering the primitives. The fragments generated by the rasteriser are then sent onwards to the rest of the pipeline for processing.

The early Z/stencil stage 214 performs a Z (depth) test on fragments it receives from the rasteriser 212, to see if any fragments can be discarded (culled) at this stage. To do this, it compares the depth values of (associated with) fragments issuing from the rasteriser 212 with the depth values of fragments that have already been rendered (these depth values are stored in a depth (Z) buffer that is part of the tile buffer 222) to determine whether the new fragments will be occluded by fragments that have already been rendered (or not). At the same time, an early stencil test is carried out. Fragments that pass the fragment early Z and stencil test stage 214 are then sent to the fragment shading stage 216.

The fragment shading stage 216 performs the appropriate fragment processing operations on the fragments that pass the early Z and stencil tests, so as to process the fragments to generate the appropriate rendered fragment data. This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 216 is in the form of a shader pipeline (a programmable fragment shader).

There is then a "late" fragment Z and stencil test stage 218, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 222 to determine whether the fragment data for the new fragments should replace the fragment data of the fragments that have already been rendered, by comparing the depth values of (associated with) fragments issuing from the fragment shading stage 216 with the depth values of fragments that have already been rendered (as stored in the depth buffer). This late fragment depth and stencil test stage 218 also carries out any necessary "late" alpha and/or stencil tests on the fragments.

The fragments that pass the late fragment test stage 218 are then subjected to, if required, any necessary blending operations with fragments already stored in the tile buffer 222 in the blender 220. Any other remaining operations necessary on the fragments, such as dither, etc. (not shown) are also carried out at this stage.

Finally, the (blended) output fragment data (values) are written to the tile buffer 222 from where they can, for example, be output to a texture buffer or a frame buffer for display. The depth value for an output fragment is also written appropriately to a Z-buffer within the tile buffer 222.

The tile buffer 222 will store colour and depth buffers that store an appropriate colour, etc., or Z-value, respectively, for each sampling point that the buffers represent (in essence for each sampling point of a tile that is being processed). These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

In the present embodiment, the tile buffer 222 stores its fragment data as 32×32 arrays (i.e. corresponding to a 32×32 array of sample positions in the output to be generated, e.g., in the image to be displayed). Each 32×32 data position array in the tile buffer can accordingly correspond to (and will "natively" support) a 16×16 pixel "tile" of, e.g., the frame to be displayed, at 4× anti-aliasing (i.e. when taking 4 samples per pixel).

The tile buffer 222 is provided as part of RAM that is located on (local to) the graphics processing pipeline (chip). The data from the tile buffer 222 is input to a downsampling (multisample resolve) write out unit 224, and thence output (written back) to an external memory output buffer, such as a texture buffer or a frame buffer of a display device (not shown). The display device could comprise, e.g., a display comprising an array of pixels, such as a computer monitor or a printer.

The downsampling and writeout unit 224 downsamples the fragment data stored in the tile buffer 222 to the appropriate resolution for the output buffer (device), i.e. such that an array of pixel data corresponding to the pixels of the output device is generated, to generate output values (pixels) for output to the output buffer.

Once a tile of the render output has been processed and its data exported to a main memory (e.g. to a texture buffer or frame buffer in a main memory (not shown)) for storage, the next tile is then processed, and so on, until sufficient tiles have been processed to generate the entire render output (e.g. graphics texture or frame (image) to be displayed). The process is then repeated for the next render output (e.g. graphics texture or frame) and so on.

Other arrangements for the graphics processing pipeline 200 would, of course, be possible.

The above describes certain features of the operation of the graphics processing system shown in FIGS. 1 and 2. Further features of the operation of the graphics processing system shown in FIGS. 1 and 2 in accordance with embodiments of the technology described herein will now be described.

As can be seen from FIG. 2, the graphics processing pipeline 200 includes a number of programmable processing or "shader" stages, for example the vertex shader 202, hull shader 204, domain shader 208, geometry shader 210, and the fragment shader 216. These programmable shader stages execute respective shader programs that have one or more input variables and generate sets of output variables and that are provided by the application. To do this, the application 104 provides the shader programs implemented using a high-level shader programming language, such as GLSL, HLSL, OpenCL, etc. These shader programs are then translated by a shader language compiler to binary code for the target graphics processing pipeline 200. This may include the creation of one or more intermediate representations of the program within the compiler. The compiler may, e.g., be part of the driver 108, with there being a special API call to cause the compiler to run. The compiler execution can thus be seen as being part of the draw call preparation done by the driver in response to API calls generated by an application.

In this embodiment, the shader programs contain constant expressions, such as operations expressed in a shader language that have constant inputs. These constant expressions can be classified into two types: compile time constant expressions, which are defined in language specifications (such as literal values, an arithmetic operator with constant arguments, etc.); and run time constant expressions. Run time constant expressions are not defined anywhere, but can be seen as a global variable that is known to be constant for one or more particular draw calls (e.g. for all pipeline stages used within those one or more draw calls) and all operations in a shader program that depend only on the global variable in question. In the case of run time constant expressions, the value of the variable is not known by the compiler at compile time. An example of such a variable is an expression qualified as "uniform" in a GLSL shader program.

The present embodiment operates to identify both types of constant program expressions in shader programs and to extract them from the original shader program and to instead execute them in an initial "pilot" shader program. To do this, the shader compiler identifies such constant expressions in a given shader program to be executed, removes such expressions from the original shader program (prevents such expressions from being emitted into the target GPU code), and creates a separate shader program (binary code) that contains hardware instructions only for the constant program expressions to thereby create an initial pilot shader program that can be executed in advance of a subsequent "main" shader program. The compiler also creates the subsequent main shader program that corresponds to the initial pilot shader program by substituting the constant expressions in the original shader program with appropriate load instructions pointing to where the output results from the initial pilot shader program will be stored.

Figure 3:
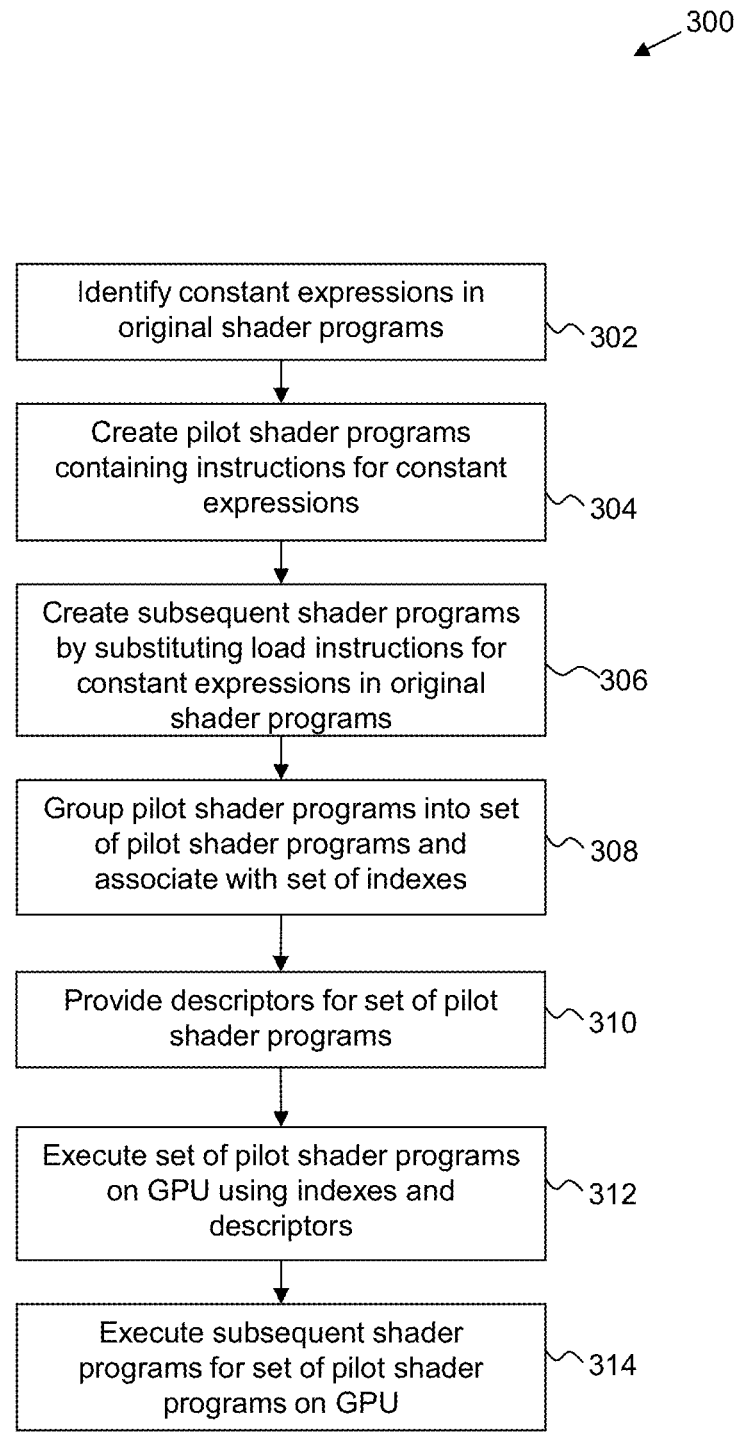
FIG. 3 shows a method of operating a graphics processing system in the manner of the technology described herein.

FIG. 3 illustrates this process 300 for plural shader programs to be executed for the draw calls for a given desired graphics processing output. As is shown in FIG. 3, the shader compiler will first identify any constant expressions in the respective original shader programs (step 302). The shader compiler then creates respective initial pilot shader programs (binary code) that contain hardware instructions only for the identified constant expressions (step 304). The shader compiler also removes instructions emitted for such expressions from the respective original shader programs, and substitutes them with appropriate load instructions pointing to where the output results from the corresponding initial pilot shader programs will be stored to thereby create subsequent shader programs for the respective initial pilot shader programs (step 306).

In the present embodiment, the compiler configures the initial pilot shader programs such that they output to respective colour buffers (render targets) in the tile buffer 222. The corresponding load instructions substituted into the subsequent main shader programs then map to these respective colour buffers so that the subsequent main shader programs will use the results of the corresponding initial pilot shader programs as inputs, where required. Other arrangements for the output of the pilot shader programs, such as remapping the pilot shader programs' stack areas, can be used, if desired. In general any storage accessible in a shader program via graphics processing pipeline instructions (such as main memory, stack memory, a tile buffer, uniform memory, and so on) can be used for the output of an initial pilot shader program.

The shader compiler then groups plural pilot shader programs together into a set of pilot shader programs and associates the set of pilot shader programs with a set of indexes (step 308). In the present embodiment, the set of pilot shader programs are represented as an array of program counters for the respective pilot shader programs. A program counter can then be obtained for an initial pilot shader program by indexing into the array. In other embodiments, the array can comprise pointers to the program counters, rather than the program counters themselves.

The shader compiler also provides draw call descriptors for the set of pilot shader programs (step 310). In the present embodiment, the draw call descriptors are represented by plural, suitably sorted, arrays of pointers to input descriptor tables, including an array of pointers to uniform descriptor tables, an array of pointers to sampler descriptor tables, and an array of pointers to texture descriptor tables, with a given element position in the arrays corresponding to a given initial pilot shader program. In other embodiments, the descriptors can be represented by a single array rather than plural arrays and/or can comprise the descriptors themselves, rather than pointers to those descriptors. In other embodiments, the descriptors can comprise generalised resource descriptors.

Once the pilot and subsequent shader programs have been compiled, the set of initial pilot shader programs are executed on the graphics processing pipeline 200 (step 312). In this embodiment, this comprises executing threads for the set of initial pilot shader programs to generate and store output values for the constant program expressions of those initial pilot shader programs. In this embodiment, the thread index for the thread that is used to execute a given initial pilot shader program is used to index into the array of program counters to obtain the program counter for that initial pilot shader program, and hence obtain the instructions for that initial pilot shader program. In this embodiment, the thread indexes for the threads are also used to index into the arrays of pointers to descriptors in order to obtain the corresponding descriptors for executing the constant program expressions of the initial pilot shader programs.

Once the pilot shader programs have been executed, the subsequent main shader programs corresponding to the pilot shader programs are executed on the graphics processing pipeline 200 (step 314). In this embodiment, this comprises executing threads for the subsequent main shader programs that load the output values generated and stored for the constant program expressions by executing the corresponding initial pilot shader programs. The threads also execute any other (e.g. non-constant) expressions for the original shader programs.

The process of step 312 of FIG. 3 will now be described in further detail with reference to FIGS. 4, 5 and 6.

Figure 4:
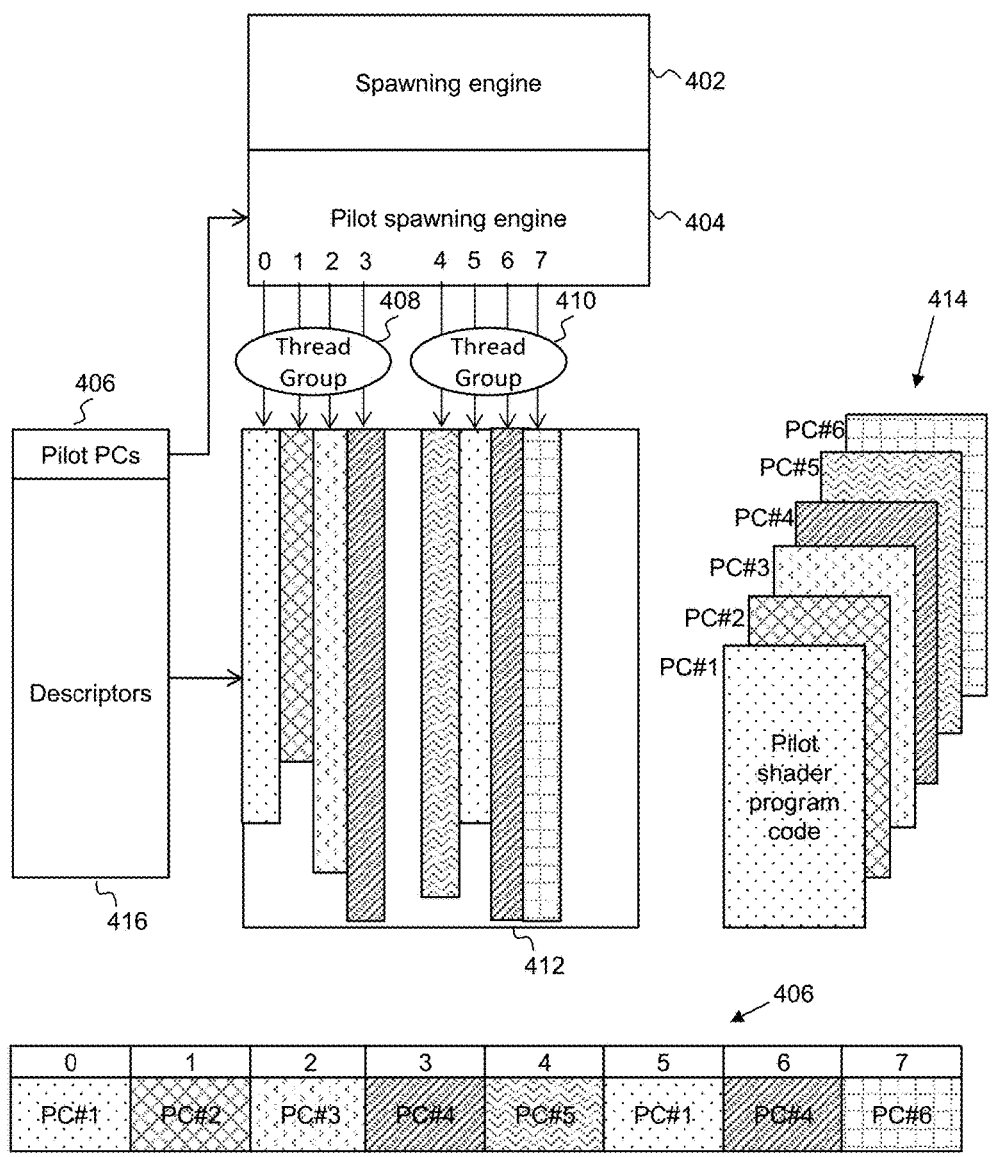
FIG. 4 illustrates schematically a first embodiment of the operation of a graphics processing system in the manner of the technology described herein.

FIG. 4 shows schematically a first embodiment of the operation of the graphics processor 106 which is shown in FIG. 1. FIG. 4 shows a spawning engine 402 of the graphics processor 106, which comprises hardware (circuitry) for generating or "spawning" threads for executing shader programs. In this embodiment, the graphics processor 106 further comprises a dedicated "pilot" spawning engine 404, which comprises hardware (circuitry) for spawning threads for executing initial pilot shader programs. In doing this, the pilot spawning engine 404 uses a thread index for an initial pilot shader program to index into an array of pilot program counters 406 for a set of initial pilot shader programs 414.

In this embodiment, the array of pilot program counters 406 comprises eight pilot program counters (PC#1, PC#2, PC#3, PC#4, PC#5, PC#1, PC#4, PC#6) for six pilot shader programs 414. In this embodiment, the pilot spawning engine 404 groups four threads for executing a first subset of the initial pilot shader programs (corresponding to PC#1, PC#2, PC#3, PC#4) into a first thread group 408 and groups four threads for executing a second subset of the initial pilot shader programs (corresponding to PC#5, PC#1, PC#4, PC#6) into a second thread group 410.

The threads of each thread group are then executed in parallel, and in lockstep, one instruction at a time, in respective execution lanes by a programmable compute engine 412 of the graphics processor 106 so as to execute the subset of initial pilot shader programs of that thread group. As discussed above, executing the initial pilot shader programs 414 comprises generating and storing output values for the constant program expressions of the initial pilot shader programs 414 for use by corresponding subsequent shader programs. In doing this, the compute engine 412 also directly uses the thread indexes for the initial pilot shader programs to index into arrays of descriptors 416 for the set of initial pilot shader programs 414 to obtain the necessary descriptors 416 for executing the set of initial pilot shader programs 414. In other embodiments, the thread in question, rather than the compute engine 412, may be responsible for fetching the necessary descriptors 416 based on its thread index.

The spawning engine 402 then spawns threads for executing the subsequent shader programs. As discussed above, subsequently executing a subsequent shader program comprises, inter alia, loading the output values generated and stored for the constant program expressions by executing the corresponding initial pilot shader program.

Figure 5:
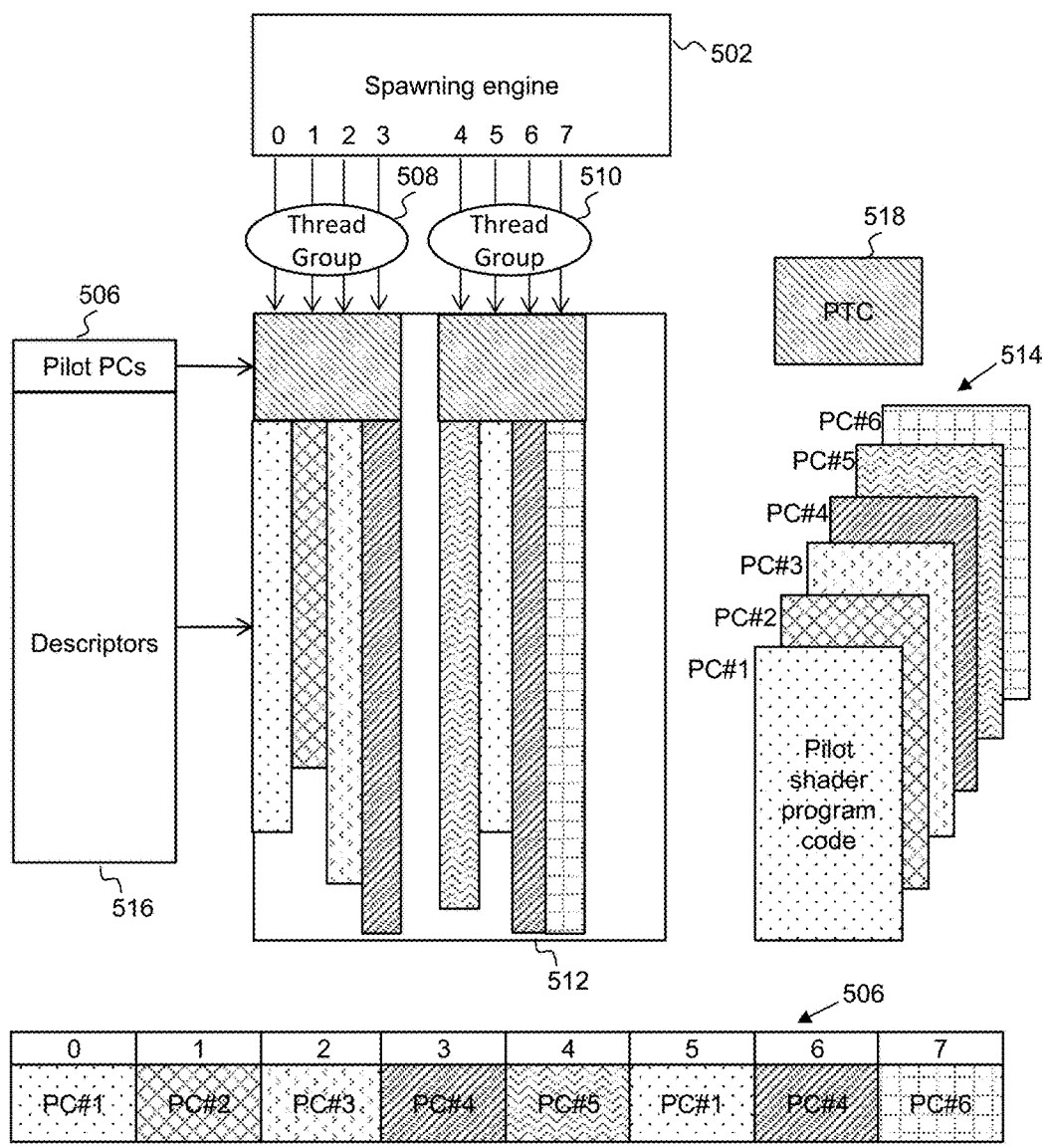
FIG. 5 illustrates schematically a second embodiment of the operation of a graphics processing system in the manner of the technology described herein.

FIG. 5 shows schematically a second embodiment of the operation of the graphics processor 106 which is shown in FIG. 1. FIG. 5 again shows a spawning engine 502 of the graphics processor 106, which comprises hardware (circuitry) for spawning threads for executing shader programs. In this embodiment, the spawning engine 502 spawns threads for executing generic pilot "trampoline" code (PTC) 518. In this embodiment, the spawning engine 502 groups four threads for executing the PTC 518 in a first thread group 508 and groups four threads for executing the PTC 518 in a second thread group 510.

The first thread group 508 and second thread group 510 are then executed by a programmable compute engine 512 of the graphics processor 106. In doing this, the PTC 518 uses a thread index for the threads to index into an array of pilot program counters 506 for the set of initial pilot shader programs 514. In this embodiment, the array of pilot program counters 506 again comprises eight pilot program counters (PC#1, PC#2, PC#3, PC#4, PC#5, PC#1, PC#4, PC#6) for six pilot shader programs 514. The PTC 518 then branches to the respective pilot shader program for each thread index. In this embodiment, the first thread group 508 accordingly comprises threads for executing a first subset of the initial pilot shader programs (corresponding to PC#1, PC#2, PC#3, PC#4) and the second thread group 510 accordingly comprises the threads for executing a second subset of the initial pilot shader programs (corresponding to PC#5, PC#1, PC#4, PC#6).

The threads of each thread group then continue to be executed in parallel, and in lockstep, one instruction at a time, in respective execution lanes by the programmable compute engine 512 so as to execute the subset of initial pilot shader programs of that thread group. As discussed above, executing the initial pilot shader programs 514 comprises generating and storing output values for the constant program expressions of the initial pilot shader programs 514 for use by corresponding subsequent shader programs. In doing this, the compute engine 512 also directly uses the thread indexes for the initial pilot shader programs to index into arrays of descriptors 516 for the set of initial pilot shader programs 514 to obtain the necessary descriptors 516 for executing the set of initial pilot shader programs 514.

The spawning engine 502 then spawns threads for executing the subsequent shader programs. As discussed above, subsequently executing a subsequent shader program comprises, inter alia, loading the output values generated and stored for the constant program expressions by executing the corresponding initial pilot shader program.

Figure 6:
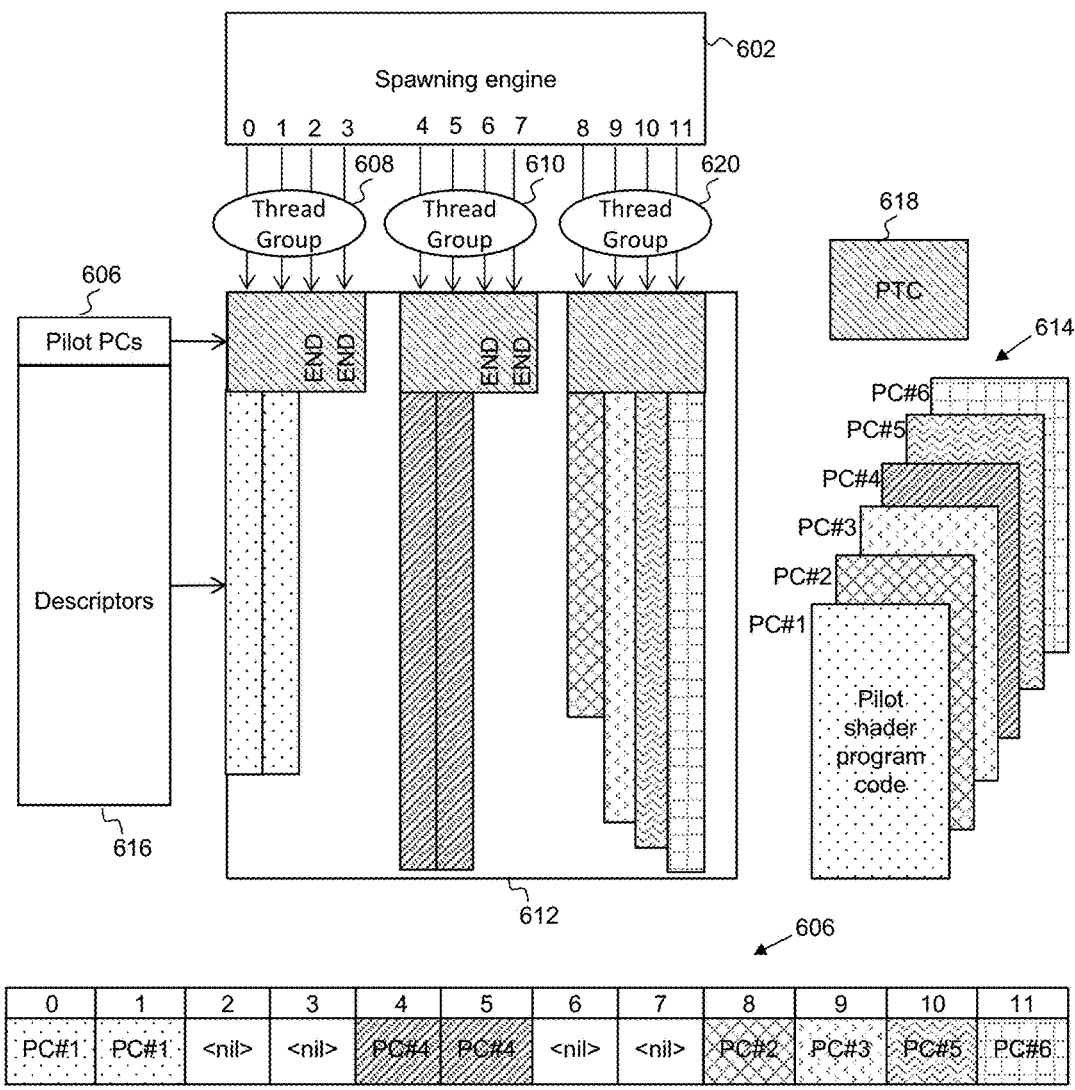
FIG. 6 illustrates schematically a third embodiment of the operation of a graphics processing system in the manner of the technology described herein.

FIG. 6 shows schematically a third embodiment of the operation of the graphics processor 106 which is shown in FIG. 1. FIG. 6 again shows a spawning engine 602 of the graphics processor 106, which spawns threads for executing shader programs. In this embodiment, the spawning engine 602 again spawns threads for executing generic pilot "trampoline" code (PTC) 618. In this embodiment, the spawning engine 602 groups fours threads for executing the PTC 618 in a first thread group 608, groups fours threads for executing the PTC 618 in a second thread group 610, and groups fours threads for executing the PTC 618 in a third thread group 620.

The first thread group 608, second thread group 610 and third thread group 620 are then executed by a programmable compute engine 612 of the graphics processor 106. In doing this, the PTC 618 again uses a thread index for the threads to index into an array of pilot program counters 606 for the set of initial pilot shader programs 614.

In this embodiment, the array of pilot program counters 606 again comprises eight pilot program counters for six pilot shader programs 614. However, in this embodiment, the pilot program counters have been sorted so as to place identical program counters next to each other in the array of pilot program counters 606, and null program counters <nil> have been inserted into the array, such that identical pilot shader programs will be executed together in the same thread group and such that the dissimilar pilot shader programs will be executed together in the same thread group. As is shown in FIG. 6, the array is thus: PC#1, PC#1, <nil>, <nil>, PC#4, PC#4, <nil>, <nil>, PC#2, PC#3, PC#5, PC#6.

The PTC 618 then either branches to the respective pilot shader program for the thread index or, when the corresponding program counter is null, terminates immediately (illustrated in FIG. 6 with "END"). In this embodiment, the first thread group 608 then accordingly comprises threads for executing a first subset of two identical initial pilot shader programs (corresponding to PC#1), the second thread group 610 comprises the threads for executing a second subset of two identical pilot shader programs (corresponding to PC#4), and the third thread group 620 comprises the threads for executing a third subset of dissimilar initial pilot shader programs (corresponding to PC#2, PC#3, PC#5, PC#6). In other embodiments, each of the dissimilar pilot shader programs may be allocated to its own thread group.

The threads of each thread group then continue to be executed in parallel, and in lockstep, one instruction at a time, in respective execution lanes by the programmable compute engine 612 so as to execute the subset of initial pilot shader programs of that thread group. As discussed above, executing the initial pilot shader programs 614 comprises generating and storing output values for the constant program expressions of the initial pilot shader programs 614 for use by corresponding subsequent shader programs. In doing this, the compute engine 612 also directly uses the thread indexes for the initial pilot shader programs of the third thread group 620 to index into arrays of descriptors 616 for that subset of initial pilot shader programs 614 to obtain the necessary descriptors 616 for executing that subset of initial pilot shader programs 614.

In this embodiment, the initial pilot shader programs of the first thread group 608 share a descriptor data structure and thus can share a first descriptor index (0). Similarly, the initial pilot shader programs of the second thread group 610 share a descriptor data structure and thus can share a second descriptor index (1). Accordingly, in this embodiment, rather than directly using the thread indexes for the initial pilot shader programs of the first thread group 608 and second thread group 610, the compute engine 612 divides each of those thread indexes by the particular thread group size specified for the compute engine 612 (in this case the particular thread group size is 4), and then takes the floor of that division to generate a descriptor index for the initial pilot shader program in question. For example, the descriptor index for thread No. 1 of the first thread group 608 is floor($1/4$)=floor(0.25)=0 and the descriptor index for thread No. 5 of second first thread group 610 is floor(5/4)=floor(1.25)=1. This means that only two descriptor indexes (0 and 1), and thus only two corresponding descriptor data structures, are needed for the initial pilot shader programs of the first thread group 608 and second thread group 610, rather than eight descriptor data structures. The compute engine 612 then uses the descriptor indexes for the initial pilot shader programs of the first thread group 608 and second thread group 610 to index into the arrays of descriptors 616 for those subsets of initial pilot shader programs 614 to obtain the necessary descriptors 616 for executing those subsets of initial pilot shader programs 614.

The spawning engine 602 then spawns threads for executing the subsequent shader programs. As discussed above, subsequently executing a subsequent shader program comprises, inter alia, loading the output values generated and stored for the constant program expressions by executing the corresponding initial pilot shader program.

Other embodiments are contemplated. For example, with reference to the embodiment of FIG. 4, if the pilot program counters were to be sorted and null program counters inserted so as to place identical program counters next to each other in the array of pilot program counters (e.g. as per the embodiment of FIG. 6), the pilot spawning engine 404 of FIG. 4 may spawn dummy threads that terminate immediately or may disable execution lanes in cases where the program counter for a particular thread is null.

It can be seen from the above that embodiments of the technology described herein provide for efficient preparation and execution of plural initial pilot shader programs. This is achieved in embodiments of the technology described herein by grouping plural initial pilot shader programs into a set of initial pilot shader programs and associating the set of initial pilot shader programs with a set of indexes. An index associated with an initial pilot shader program can then be used to obtain the instructions contained in the initial pilot shader program for executing the constant program expressions of the initial pilot shader program. This is further achieved in embodiments of the technology described herein by grouping threads for executing a subset of the initial pilot shader programs into a thread group and executing the threads of the thread group in parallel.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing system that comprises programmable processing circuitry configured to execute graphics shader programs to perform graphics processing operations, the method comprising:
   grouping plural initial shader programs into a set of initial shader programs, wherein an initial shader program of the set of initial shader programs contains instructions for executing constant program expressions of an original shader program, and wherein grouping the plural initial shader programs into the set of initial shader programs comprises providing an array of program counters or pointers to program counters for the set of initial shader programs;
   associating the set of initial shader programs with a set of indexes, wherein an index associated with an initial shader program indicates the instructions contained in the initial shader program for executing the constant program expressions of the initial shader program; and
   for an initial shader program of the set of initial shader programs:
      using the index associated with the initial shader program to obtain the instructions contained in the initial shader program for executing the constant program expressions of the initial shader program, wherein using the index associated with the initial shader program to obtain the instructions contained in the initial shader program comprises using the index to index into the array to obtain the program counter, or the pointer to the program counter and then the program counter, for the initial shader program; and
      causing the programmable processing circuitry to execute the initial shader program, wherein executing the initial shader program comprises generating and storing output values for the constant program expressions of the initial shader program for use by a subsequent shader program.

2. A method as claimed in claim 1, wherein grouping the plural initial shader programs into the set of initial shader programs comprises sorting the array of program counters or pointers to program counters for the set of initial shader programs such that program counters or pointers to program counters that are identical are placed adjacent to each other in the array.

3. A method as claimed in claim 1, wherein grouping the plural initial shader programs into the set of initial shader programs comprises sorting the array of program counters or pointers to program counters for the set of initial shader programs based on similarity of the initial shader programs such that program counters or pointers to program counters that correspond to initial shader programs that are similar or identical are placed adjacent to each other in the array.

4. A method as claimed in claim 1, wherein the index associated with the initial shader program corresponds to a thread index for a thread that executes the initial shader program.

5. A method as claimed in claim 1, wherein executing the initial shader program comprises using a descriptor index to obtain draw call descriptors for the initial shader program, wherein the descriptor index for the initial shader program corresponds to a thread index for a thread that executes the initial shader program.

6. A method as claimed in claim 1, further comprising, for the initial shader program of the set of initial shader programs, causing the programmable processing circuitry subsequently to execute the subsequent shader program corresponding to the initial shader program, wherein subsequently executing the subsequent shader program comprises, in response to load instructions of the subsequent shader program that point to output values generated and stored for the constant program expressions by executing the initial shader program, loading the output values generated and stored for the constant program expressions by executing the initial shader program for processing by the subsequent shader program.

7. A method as claimed in claim 1, further comprising:
   grouping threads for executing a subset of initial shader programs of the set of initial shader programs into a thread group; and
   causing the programmable processing circuitry to execute the threads of the thread group in parallel so as to execute the subset of initial shader programs.

8. A method of operating a graphics processing system that comprises programmable processing circuitry configured to execute graphics shader programs to perform graphics processing operations, the method comprising:
   grouping threads for executing a subset of initial shader programs of a set of initial shader programs into a thread group, wherein an initial shader program of the set of initial shader programs contains instructions for executing constant program expressions of an original shader program, and wherein an array of program counters or pointers to program counters is provided for the set of initial shader programs; and
   for an initial shader program of the subset of initial shader programs:
      using an index associated with the initial shader program to obtain the instructions contained in the initial shader program for executing the constant program expressions of the initial shader program, wherein using the index associated with the initial shader program to obtain the instructions contained in the initial shader program comprises using the index to index into the array to obtain the program counter, or the pointer to the program counter and then the program counter, for the initial shader program; and
      causing the programmable processing circuitry to execute the threads of the thread group in parallel so as to execute the subset of initial shader programs, wherein executing an initial shader program of the subset of initial shader programs comprises generating and storing output values for the constant program expressions of the initial shader program for use by a subsequent shader program.

9. A method as claimed in claim 8, wherein the thread group comprises threads for a subset of initial shader programs that are similar or identical to each other.

10. A graphics processing system comprising:
    programmable processing circuitry configured to execute graphics shader programs to perform graphics processing operations; and
    processing circuitry configured to:

group plural initial shader programs into a set of initial shader programs, wherein an initial shader program of the set of initial shader programs contains instructions for executing constant program expressions of an original shader program, and wherein grouping the plural initial shader programs into the set of initial shader programs comprises providing an array of program counters or pointers to program counters for the set of initial shader programs;

associate the set of initial shader programs with a set of indexes, wherein an index associated with an initial shader program indicates the instructions contained in the initial shader program for executing the constant program expressions of the initial shader program; and for an initial shader program of the set of initial shader programs:
use the index associated with the initial shader program to obtain the instructions contained in the initial shader program for executing the constant program expressions of the initial shader program, wherein using the index associated with the initial shader program to obtain the instructions contained in the initial shader program comprises using the index to index into the array to obtain the program counter, or the pointer to the program counter and then the program counter, for the initial shader program; and
cause the programmable processing circuitry to execute the initial shader program, wherein executing the initial shader program comprises generating and storing output values for the constant program expressions of the initial shader program for use by a subsequent shader program.

11. A system as claimed in claim 10, wherein grouping the plural initial shader programs into the set of initial shader programs comprises sorting the array of program counters or pointers to program counters for the set of initial shader programs such that program counters or pointers to program counters that are identical are placed adjacent to each other in the array.

12. A system as claimed in claim 10, wherein grouping the plural initial shader programs into the set of initial shader programs comprises sorting the array of program counters or pointers to program counters for the set of initial shader programs based on similarity of the initial shader programs such that program counters or pointers to program counters that correspond to initial shader programs that are similar or identical are placed adjacent to each other in the array.

13. A system as claimed in claim 10, wherein the index associated with the initial shader program corresponds to a thread index for a thread that executes the initial shader program.

14. A system as claimed in claim 10, wherein executing the initial shader program comprises using a descriptor index to obtain draw call descriptors for the initial shader program, wherein the descriptor index for the initial shader program corresponds to a thread index for a thread that executes the initial shader program.

15. A system as claimed in claim 10, wherein the processing circuitry is further configured to, for the initial shader program of the set of initial shader programs, cause the programmable processing circuitry subsequently to execute the subsequent shader program corresponding to the initial shader program, wherein subsequently executing the subsequent shader program comprises, in response to load instructions of the subsequent shader program that point to output values generated and stored for the constant program expressions by executing the initial shader program, loading the output values generated and stored for the constant program expressions by executing the initial shader program for processing by the subsequent shader program.

16. A system as claimed in claim 10, wherein the processing circuitry is further configured to:
group threads for executing a subset of initial shader programs of the set of initial shader programs into a thread group; and
cause the programmable processing circuitry to execute the threads of the thread group in parallel so as to execute the subset of initial shader programs.

17. A graphics processing system comprising:
programmable processing circuitry configured to execute graphics shader programs to perform graphics processing operations; and
processing circuitry configured to:
group threads for executing a subset of initial shader programs of a set of initial shader programs into a thread group, wherein an initial shader program of the set of initial shader programs contains instructions for executing constant program expressions of an original shader program, and wherein an array of program counters or pointers to program counters is provided for the set of initial shader programs; and
for an initial shader program of the subset of initial shader programs:
use an index associated with the initial shader program to obtain the instructions contained in the initial shader program for executing the constant program expressions of the initial shader program, wherein using the index associated with the initial shader program to obtain the instructions contained in the initial shader program comprises using the index to index into the array to obtain the program counter, or the pointer to the program counter and then the program counter, for the initial shader program; and
cause the programmable processing circuitry to execute the threads of the thread group in parallel so as to execute the subset of initial shader programs, wherein executing an initial shader program of the subset of initial shader programs comprises generating and storing output values for the constant program expressions of the initial shader program for use by a subsequent shader program.

18. A system as claimed in claim 17, wherein the thread group comprises threads for a subset of initial shader programs that are similar or identical to each other.

19. A non-transitory computer readable storage medium storing computer software code which, when executed by processing circuitry of a graphics processing system that comprises programmable processing circuitry configured to execute graphics shader programs to perform graphics processing operations, performs a method comprising:
grouping plural initial shader programs into a set of initial shader programs, wherein an initial shader program of the set of initial shader programs contains instructions for executing constant program expressions of an original shader program, and wherein grouping the plural initial shader programs into the set of initial shader programs comprises providing an array of program counters or pointers to program counters for the set of initial shader programs;

associating the set of initial shader programs with a set of indexes, wherein an index associated with an initial shader program indicates the instructions contained in the initial shader program for executing the constant program expressions of the initial shader program; and for an initial shader program of the set of initial shader programs:
- using the index associated with the initial shader program to obtain the instructions contained in the initial shader program for executing the constant program expressions of the initial shader program, wherein using the index associated with the initial shader program to obtain the instructions contained in the initial shader program comprises using the index to index into the array to obtain the program counter, or the pointer to the program counter and then the program counter, for the initial shader program; and
- causing the programmable processing circuitry to execute the initial shader program, wherein executing the initial shader program comprises generating and storing output values for the constant program expressions of the initial shader program for use by a subsequent shader program.

20. A non-transitory computer readable storage medium storing computer software code which, when executed by processing circuitry of a graphics processing system that comprises programmable processing circuitry configured to execute graphics shader programs to perform graphics processing operations, performs a method comprising:
- grouping threads for executing a subset of initial shader programs of a set of initial shader programs into a thread group, wherein an initial shader program of the set of initial shader programs contains instructions for executing constant program expressions of an original shader program, and wherein an array of program counters or pointers to program counters is provided for the set of initial shader programs; and
- for an initial shader program of the subset of initial shader programs:
  - using an index associated with the initial shader program to obtain the instructions contained in the initial shader program for executing the constant program expressions of the initial shader program, wherein using the index associated with the initial shader program to obtain the instructions contained in the initial shader program comprises using the index to index into the array to obtain the program counter, or the pointer to the program counter and then the program counter, for the initial shader program; and
- causing the programmable processing circuitry to execute the threads of the thread group in parallel so as to execute the subset of initial shader programs, wherein executing an initial shader program of the subset of initial shader programs comprises generating and storing output values for the constant program expressions of the initial shader program for use by a subsequent shader program.

* * * * *